(12) United States Patent
Guenaltay et al.

(10) Patent No.: US 7,582,724 B2
(45) Date of Patent: Sep. 1, 2009

(54) RECOVERING ETHYLENE AND VINYL ACETATE FROM THE RESIDUAL GAS STREAM OF VINYL ESTER-ETHYLENE COPOLYMER PREPARATION

(75) Inventors: Mehmet Guenaltay, Emmerting (DE); Manfred Selig, Burghausen (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 12/158,468

(22) PCT Filed: Dec. 14, 2006

(86) PCT No.: PCT/EP2006/069717

§ 371 (c)(1),
(2), (4) Date: Jun. 20, 2008

(87) PCT Pub. No.: WO2007/074075

PCT Pub. Date: Jul. 5, 2007

(65) Prior Publication Data

US 2008/0269434 A1   Oct. 30, 2008

(30) Foreign Application Priority Data

Dec. 22, 2005   (DE) ................. 10 2005 061 576

(51) Int. Cl.
*C08F 6/24* (2006.01)
*C08F 6/14* (2006.01)
*C08F 218/08* (2006.01)

(52) U.S. Cl. ..................... 528/501; 526/331

(58) Field of Classification Search ............ 528/501, 528/503; 526/331
See application file for complete search history.

(56) References Cited

U.S. PATENT DOCUMENTS

| 4,091,200 A | * | 5/1978 | Vandegaer .................. 528/495 |
| 4,657,994 A | * | 4/1987 | Tanaka et al. ................. 526/68 |
| 2004/0097701 A1 | | 5/2004 | Weitzel et al. |

FOREIGN PATENT DOCUMENTS

| EP | 0 127 253 A1 | 12/1984 |
| EP | 1 420 034 A1 | 5/2004 |
| WO | 01/00559 A1 | 1/2001 |

* cited by examiner

*Primary Examiner*—Fred M Teskin
(74) *Attorney, Agent, or Firm*—Brooks Kushman P.C.

(57) ABSTRACT

In a process for the preparation of copolymers containing vinyl esters and ethylene or ethylenically unsaturated monomers by aqueous, free radical polymerization at a pressure of from 5 to 100 bar absolute by the emulsion or suspension polymerization method, after the end of the polymerization, the reaction mixture is let down to a pressure of from 0.1 to 5 bar absolute and recovery of unconverted monomers is effected by multistage fractional low-temperature condensation from the residual gas.

11 Claims, 2 Drawing Sheets

RECOVERING ETHYLENE AND VINYL ACETATE FROM THE RESIDUAL GAS STREAM OF VINYL ESTER-ETHYLENE COPOLYMER PREPARATION

CROSS-REFERENCE TO RELATED APPLICATIONS

This application is the U.S. national phase of PCT Appln. No. PCT/EP2006/069717 filed Dec. 14, 2006 which claims priority to German application DE 10 2005 061 576.7 filed Dec. 22, 2005.

BACKGROUND OF THE INVENTION

1. Field of the Invention

The invention relates to a process for the recovery of unreacted monomers which occur in the residual gas stream of the vinyl ester-ethylene copolymer preparation.

2. Description of the Related Art

Polymers based on vinyl esters and ethylene are frequently used as aqueous dispersions or polymer powders redispersible in water in all kinds of applications, for example as coating materials or adhesives for a very wide range of substrates.

In industrial-scale polymerization, high conversions are state of the art. Thus, the polymers are usually polymerized to a residual monomer content of less than 0.1% by weight, preferably even less than 0.05% by weight, and, in the case of vinyl chloride, of less than 0.01% by weight. However, these high conversions relate only to the monomers which are liquid under polymerization conditions. Ethylene as a monomer which is gaseous under polymerization conditions does not comply with these laws. Firstly, it polymerizes more slowly than, for example, vinyl acetate and secondly it is present to a large proportion in the gas phase and cannot be included under the usual conditions of emulsion polymerization.

From economic points of view, the industrial polymerization should be complete in periods which are as short as possible, which, however inevitably means that the ethylene used cannot be completely consumed. Usually, the polymerization is stopped at a residual ethylene content of less than 5% by weight, preferably less than 2% by weight, and the reaction batch is let down to atmospheric pressure. The flash process includes the transfer of the reaction mixture comprising polymer dispersion and residual gas from a pressure reactor to a reactor at atmospheric pressure, the so-called flash vessel, with removal of the residual ethylene. The resulting residual gas contains mainly ethylene, vinyl acetate, nitrogen and steam.

A conventional method from the prior art is the utilization of the resulting residual gas for energy through combustion. In view of increasing raw material costs, the physical recovery of the individual components and monomers has substantial advantages from the economic point of view.

The prior art discloses various processes for residual ethylene recovery. Patent WO 01/00559 A1 describes a process for recovering ethylene from the ethylene-containing inert gas stream obtained in vinyl acetate production. For this purpose, the ethylene-containing inert gas is taken up in vinyl acetate, and the ethylene is liberated in a vacuum vessel by flashing and is then recompressed for re-use. A process in which the ethylene-containing inert gas stream is taken up in acetic acid and brought into contact with ethylene-containing residual gas in a stripping column and the ethylene is recovered at the top of the column and re-used in the vinyl acetate synthesis is furthermore described.

The patent EP 0 127 253 A1 relates to the residual monomer removal in the gas-phase polymerization of copolymers of ethylene and higher olefins. For this purpose, the solid copolymer is freed from the higher olefins at reduced pressure and then treated with inert gas-free reactor gas, which is finally recycled to the polymerization.

All methods known to date from the prior art have the disadvantage that they do not optimally utilize the resulting residual gas.

SUMMARY OF THE INVENTION

It was therefore an object of the present invention to provide a process which makes it possible to separate the valuable substances from the resulting residual gas in order to be able to utilize them commercially. These and other objects were achieved by the process according to the invention which works up the residual gas by fractional condensation and thus makes the raw materials present available for further physical utilization.

DETAILED DESCRIPTION OF THE PREFERRED EMBODIMENTS

Figure 1:
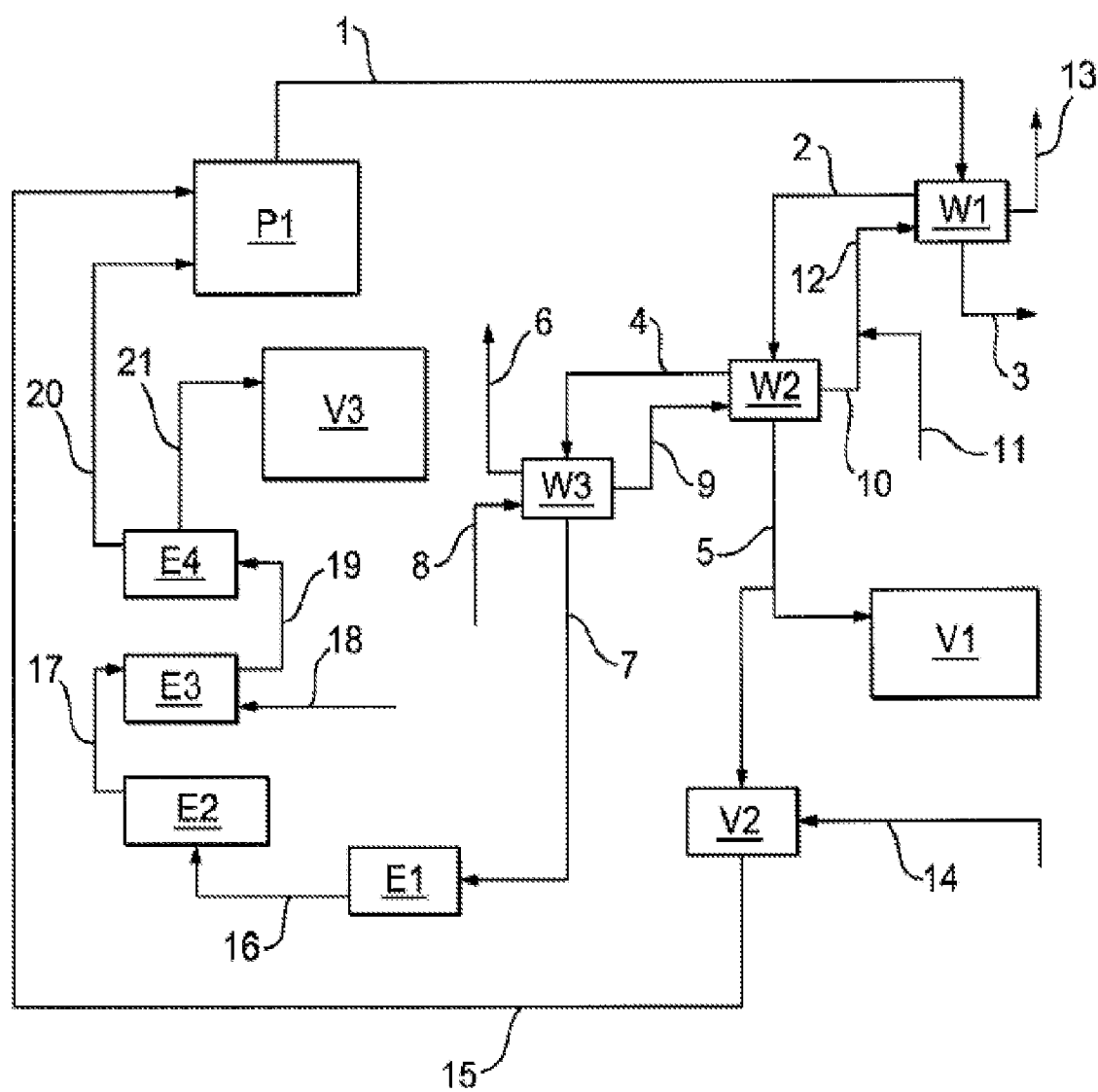
FIG. 1 is a process flow diagram of one embodiment of the invention with a three stage fractional condensation with gaseous ethylene recycle.

The invention thus relates to a process for the preparation of copolymers containing vinyl ester and ethylene or ethylenically unsaturated monomers by aqueous, free radical polymerization at a pressure of from 5 to 100 bar absolute by the emulsion or suspension polymerization process, wherein, after the end of the polymerization, the reaction mixture is let down to a pressure of from 0.1 to 5 bar absolute and the unreacted monomers are recovered from the residual gas by multistage fractional low-temperature condensation.

Mixtures of vinyl acetate and ethylene, and mixtures of vinyl acetate and further vinyl esters such as vinyl laurate or vinyl esters of a-branched monocarboxylic acids having 9 to 13 C atoms and, ethylene, are preferably used for the polymerization. The polymerization process can be operated completely continuously as well as batchwise.

The polymerization is preferably complete at a conversion of at least 95 to 99% by weight of the monomers which are liquid under polymerization conditions.

In a preferred embodiment of the process, the multistage condensation plant is arranged on the suction side of the vacuum pump which gives rise to the reduced pressure in the flash vessel. The advantage of this arrangement is that no components formed by polymerization and byproduct formation in the vacuum pump can change the composition of the residual gas. Consequently, the re-use of the original substances, such as ethylene and vinyl acetate, in particular in the polymerization, is not endangered.

In a further preferred embodiment of the process, the multistage condensation plant is arranged on the pressure side of a compressor. With the aid of compressed ethylene, from the gas-jet compressor, the residual gas can be evacuated from the flash vessel. As a result, the abovementioned disadvantages of a vacuum pump, for example of the liquid ring pump, are avoided.

Liquid nitrogen or liquefied air having a temperature of use from −180 to −170° C. at corresponding boiling pressure of from 5 to 10 bar absolute is preferably used as a refrigeration medium. The nitrogen leaves the plant in gaseous form at room temperature and can be used in the dispersion plant for blanketing purposes or can be integrated into an existing plant network.

The process according to the invention is a fractional condensation of the residual gas, in which the different boiling and freezing points of the main components, for example ethylene, vinyl acetate, water and nitrogen, represent the basis of the material separation. Table 1 shows the boiling and freezing points of some important main components which may be present in the residual gas.

TABLE 1

| Component | Boiling point [° C.] | Freezing point [° C.] |
| --- | --- | --- |
| Water | 100 | 0 |
| Vinyl acetate | 73 | −93 |
| Ethylene | −103 | −169 |
| Ethyl acetate | 77 | −84 |
| Methanol | 65 | −97 |
| Methyl acetate | 57 | −98 |
| Acetaldehyde | 20 | −123 |

The condensation of the individual components from the residual gas stream is effected on the production scale of the process according to the invention by connecting at least two, preferably three, condensation stages to form a cascade. The temperatures are adjusted so that failure to reach the freezing point of the component condensing out in the respective stage is avoided.

In the process according to the invention, the water vapor is condensed out in the first condensation stage at temperatures of at least 1° C., preferably from 1 to 5° C.

Furthermore, in the process according to the invention, vinyl acetate is condensed out at temperatures of from −90 to −60° C. in the second condensation stage. The liquid vinyl acetate thus obtained is recycled to the polymerization or is fed into the distillation system in a vinyl acetate monomer production plant.

In addition, in the process according to the invention, ethylene is condensed out at temperatures of from −140 to −100° C. in the third condensation stage. The liquid ethylene thus obtained is then fed back into the polymerization.

In a further embodiment of the process, the ethylene obtained in liquid form is vaporized under a pressure of from 1 to 20 bar absolute and then fed back into the polymerization reaction in compressed form or fed into the reaction circulation as raw material in a vinyl acetate monomer production plant.

The residual gas to be worked up has the following composition, depending on the pressure and the temperature of the respective polymerization: from 1 to 15% by volume of water, from 5 to 20% by volume of vinyl acetate and from 60 to 90% by volume of ethylene. Nitrogen and traces of acetaldehyde, methanol, ethyl acetate and ethyl acetate are present as further components. The operating pressure which prevails during the flashing of the dispersion is from 100 to 5000 mbar absolute. The temperature is from 25 to 75° C.

The process according to the invention is described again in more detail below with reference to the two flow diagrams in FIGS. 1 and 2.

The flow diagram for the gaseous ethylene recovery of the process according to the invention is shown in FIG. 1. The flow diagram for the liquid ethylene recycling of the process according to the invention is shown in FIG. 2.

Figure 2:
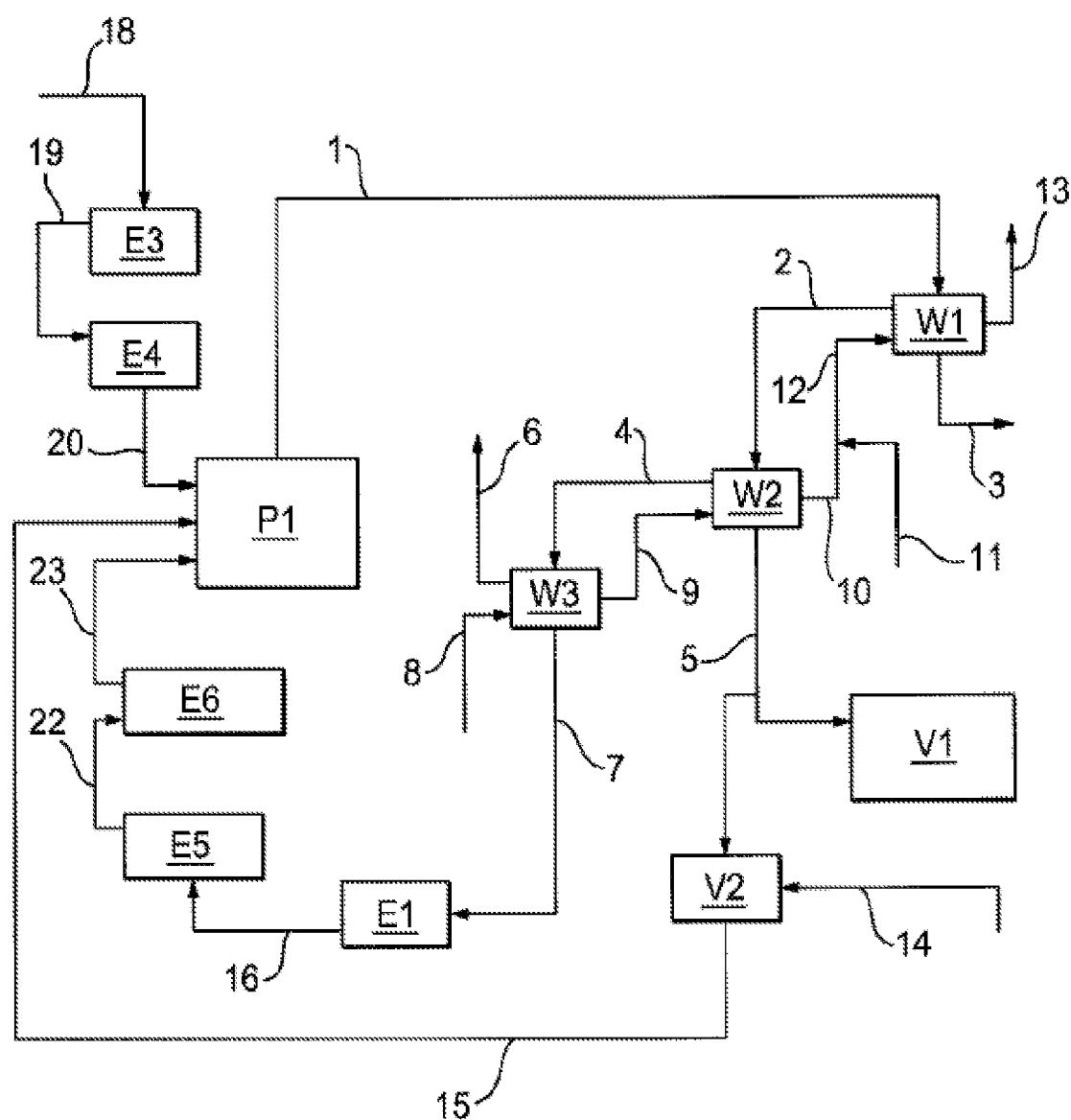
FIG. 2 is a process flow diagram of a further embodiment of the invention with liquid ethylene recycle.

The following description is applicable both to FIG. 1 and to FIG. 2. The polymerization [P1] can be effected continuously as well as batchwise. After the subsequent let down of the reaction mixture, the residual gas [1] is fed to the fractional low-temperature condensation. The resulting residual gas stream [1] is fed to the first condensation stage [W1], and the residual gas [2] and condensate [3] formed here leave the first stage in [W1] at a temperature of at least 1° C. The residual gas [2] is passed into the second condensation stage [W2], the residual gas [4] and condensate [5] formed here leaving the second stage [W2] at a temperature of from −90 to −60° C. The residual gas [4] is passed into the third stage [W3], and the residual gas [6] and condensate [7] formed here leave the third stage [W3] at a temperature of from −140 to −100° C. In order to be able to remove the required quantities of heat in the respective condensation stages, cooling is effected with the use of liquid nitrogen. For heat removal, the third condensation stage [W3] is fed with liquid nitrogen [8] countercurrently to the residual gas [4]. The nitrogen evaporates completely and, for heat removal in the second stage [W2], is fed as gaseous nitrogen [9] countercurrently to the residual gas [2]. After the second stage [W2] the gaseous nitrogen has heated up further [10]. In order to be able to remove sufficient heat in the first stage [W1], liquid nitrogen [11] is again mixed with the nitrogen stream [10]. Thereafter, the gaseous nitrogen stream [12] thus cooled is fed to the first condenser [W1] countercurrently to the residual gas [1]. After leaving [W1], the heated nitrogen stream [13] can be put to further uses. The condensate [5] which contains vinyl acetate as the main constituent either can be fed directly to a distillation in a vinyl acetate monomer plant [V1] or is transferred to a vinyl acetate tank [V2]. [V2] moreover has a feed stream for fresh vinyl acetate [14]. From [V2], vinyl acetate [15] is then fed into the polymerization [P1]. The condensate [7] contains ethylene as the main constituent which is transported by means of an ethylene pump [E1].

The further flow of the condensate [7] depends on whether the subsequent utilization is to be effected in the liquid or gaseous state.

The gaseous ethylene recycling is shown in FIG. 1. The ethylene pump [E1] pumps the liquid ethylene [16] to an ethylene evaporator [E2]. The gaseous ethylene [17] obtained therefrom is temporarily stored in an ethylene gas buffer [E3], which can additionally be fed with fresh ethylene [18]. From there, the gaseous ethylene [19] passes into an ethylene compressor [E4] which feeds the compressed ethylene [20] to the polymerization [P1]. A further possibility consists in feeding compressed ethylene [21] to the reaction circulation of a vinyl acetate monomer plant [V3].

The liquid ethylene recycling is shown in FIG. 2. The ethylene pump [E1] pumps the liquid ethylene [16] to a liquid ethylene store [E5]. Liquid ethylene [22] can then be fed by means of a high-pressure ethylene pump [E6] via an additional feed line [23] to the polymerization [P1]. Fresh ethylene [18] is fed via an ethylene gas buffer [E3]. From there, the gaseous ethylene [19] passes into an ethylene compressor [E4] which feeds the compressed ethylene [20] to the polymerization [P1]. The process according to the invention is to be operated in a manner such that, in the fractional low-temperature condensation according to the flow diagrams in FIGS. 1 and 2, the main proportion of the water is condensed out in the first stage [W1]. In order to avoid icing of the heat exchanger, the lowest residual gas temperature [2] in this stage must not fall below +1° C. The condenser is designed so that at least 90% of the water is removed in liquid form as condensate [3].

In the second stage [W2], the lowest temperature is from −90 to −60° C., depending on the ethyl acetate concentration in the residual gas stream [2]. The condenser is designed so that more than 99% of the vinyl acetate and of the remaining hydrocarbons mentioned in table 1, with the exception of ethylene, are removed in liquid form as condensate [5].

Depending on the requirement with regard to the material reuse of the ethylene, there are the following variants for the use of a third condensation stage [W3] in the process according to the invention after removal of water, vinyl acetate and the hydrocarbons mentioned in table 1.

In the embodiment of the gaseous ethylene recycling, the ethylene is separated from the nitrogen by condensation in a third condensation stage [W3] in which, depending on the pressure, temperatures of from −140 to −100° C. are reached, and is provided in gaseous form [17] by vaporization at pressures of from 1 to 120 bar absolute.

In the above embodiment of the liquid ethylene recycling, the ethylene is separated from the nitrogen by condensation in a third condensation stage [W3] in which, depending on the pressure, temperatures of from −140 to −100° C. are reached, and is provided in liquid form (cooled) [22].

Preferably, the temperatures in a third condensation stage [W3] are from −140 to −120° C.

In a further embodiment of the gaseous ethylene recovery a third condensation stage [W3] is dispensed with if the proportion of nitrogen in the ethylene fraction, i.e. in the residual gas [4] of the second stage [W2] is not relevant for further use.

There are the following possibilities for material utilization of the individual fractions from the process according to the invention.

The condensate [5] of the second stage [W2] comprises at least 95% by mass of vinyl acetate and contains traces of water, acetaldehyde, methanol, methyl acetate and ethyl acetate. This mixture can be either used in the dispersion polymerization [P1] or integrated in the distillative working-up of a vinyl acetate monomer plant [V1].

The condensate [7] of the third stage [W3] contains at least 98% by mass of ethylene. It can be either used in the dispersion polymerization [P1] or integrated in the reaction circulation, for example of a vinyl acetate monomer plant [V3].

The residual gas [4] of the second stage [W2] contains at least 95% by mass of ethylene. It too can be either used in the dispersion polymerization [P1] or integrated in the reaction circulation, for example of a vinyl acetate monomer plant [V3]. In this embodiment of the gaseous ethylene recovery, the third stage [W3] would be dispensed with.

Heat exchangers, preferably tube-bundle heat exchangers, are used for fractional low-temperature condensation according to the invention. In order to prevent blockage of the heat exchangers and pipelines, narrow gaps and dead zones should be avoided by design in all regions through which residual gas and the condensates flow.

In order to ensure continuous operation of the multistage low-temperature condensation plant, the individual condensation stages are, in a preferred embodiment, equipped with in each case a spare condensation stage which has appropriate possibilities for switching between condensation stage and spare condensation stage. In a particularly preferred embodiment, only the second stage [W2] is provided with a corresponding spare condensation stage. As a result, maintenance work of the condensation stages is possible without problem even during continuous operation.

EXAMPLES

The following example according to the invention corresponds to that part of FIG. 1 which represents the flow diagram of the three-stage low-temperature condensation of the residual gas of a vinyl ester-ethylene copolymerization. It comprises the following component apparatuses [W1] to [W3] and the streams [1] to [12].

The residual gas stream [1] of 60 nm$^3$[STP]/h (88 kg/h), containing 75 mol % of ethylene, 11 mol % of vinyl acetate, 10 mol % of water, 1.5 mol % of ethane and in each case 0.1 mol % of acetaldehyde and methanol (remainder $N_2$), is treated in a three-stage low-temperature condensation. At an absolute pressure of 600 mbar, the residual gas temperature is 40° C.

By passing the residual gas stream [1] about 4 kW of heat are removed in the first condensation stage [W1], and residual gas [2] and condensate [3] leave the first stage [W1] at a temperature of 5° C. The residual gas [2] is depleted by 87% of water, 42% of methanol and 3.4% of acetaldehyde. The condensate [3] consists of 97% by weight of water, 1.7% by weight of vinyl acetate, 0.8% by weight of methanol and 0.1% by weight of acetaldehyde.

In the second condensation stage [W2], about 5.8 kW of heat are removed, and residual gas [4] and condensate [5] leave the stage at a temperature of −70° C. The residual gas [4] is depleted by 99.8% of vinyl acetate, 99% of acetaldehyde, 100% of water and methanol and 5.5% of ethane. The condensate [5] of the second stage consists of 2.4% by weight of water, 97% by weight of vinyl acetate, 0.2% by weight of methanol and 0.4% by weight of acetaldehyde.

The third stage [W3] is operated at −140° C.; by removal of 9.7 kW of heat, about 55 kg/h of ethylene form (>99.6% of the ethylene in the crude gas). Residual gas [6] and condensate [7] leave the stage at a temperature of −140° C. The condensate [7] consists of 98% by weight of ethylene, 1.5 to 2% by weight of ethane and traces of vinyl acetate and acetaldehyde. The residual gas [6] contains the inert gas $N_2$.

In order to be able to remove the abovementioned quantities of heat in the respective condensation stages, cooling is effected with the use of liquid nitrogen.

For heat removal, the third condensation stage [W3] is fed with about 150 kg/h of liquid nitrogen [8] at 6.5 bar absolute and −175° C. countercurrently to the residual gas [4]. The nitrogen evaporates completely and leaves this stage at −118° C. [9]. For heat removal in the second stage [W2], the gaseous nitrogen [9] is fed countercurrently to the residual gas [2]. After the second stage [W2], the gaseous nitrogen has warmed up further to +13° C. [10]. In order to be able to remove 4 kW of heat in the first stage [W1], about a further 30 kg/h of liquid nitrogen [11] are mixed with this nitrogen stream [10]. As a result the nitrogen stream [12] reaches about −46° C. at the entrance into the first condenser [W1] and leaves it at 30° C. [13].

The invention claimed is:

1. In a process for the preparation of copolymers containing vinyl acetate, ethylene, and optionally ethylenically unsaturated monomers other than vinyl acetate and ethylene in a polymerization reaction by aqueous, free radical polymerization at a pressure of from 5 to 100 bar absolute by the emulsion or suspension polymerization method, the improvement comprising reducing the pressure after the end of the polymerization to a pressure of from 0.1 to 5 bar absolute and recovering unconverted monomers by multistage fractional low-temperature condensation from a residual gas contained in the reactor, wherein water vapor is condensed from the residual gas in a first condensation stage at a temperature of from 1 to 5° C., vinyl acetate is condensed from gas leaving the first condensation stage at a temperature of from −90 to −60° C. in a second condensation stage, and ethylene is condensed from gas leaving the second condensation stage at a temperature of from −140 to −100° C. in a third condensation stage.

2. The process of claim 1, wherein ethylene is obtained in liquid form and is vaporized under a pressure of from 1 to 20 bar absolute and then compressed again and fed to the polymerization reaction or fed as a raw material into a reaction circulation in a vinyl acetate monomer production plant.

3. The process of claim 1, wherein ethylene is obtained in liquid form and is fed back into the polymerization reaction.

4. The process of claim 1, wherein the vinyl acetate is obtained in liquid form and is recycled to the polymerization reaction or fed into a distillation system in a vinyl acetate monomer production plant.

5. The process of claim 1, wherein the multistage condensation is conducted on the suction side of a vacuum pump.

6. The process of claim 1, wherein the multistage condensation is conducted on the pressure side of a compressor.

7. The process of claim 1, wherein the polymerization reaction is operated fully continuously or discontinuously.

8. The process of claim 1, wherein the polymerization reaction is conducted batchwise.

9. The process of claim 1, wherein the polymerization is stopped at a conversion of from 95 to 99% by weight of the monomers which are liquid under polymerization conditions.

10. The process of claim 1, wherein mixtures of vinyl acetate and ethylene; or mixtures of vinyl acetate and other vinyl esters and ethylene, are employed in the polymerization.

11. The process of claim 10, wherein at least one other vinyl ester is selected from the group consisting of vinyl laurate and vinyl esters of α-branched monocarboxylic acids having 9 to 13 C atoms.

* * * * *